United States Patent [19]
Matthews et al.

[11] Patent Number: 4,915,968
[45] Date of Patent: Apr. 10, 1990

[54] EXTRUSION OF MULTIPLE EXTRUDATES HAVING COMPLIMENTARY SHAPES

[75] Inventors: Bernard T. Matthews, Norwich; David J. Joll, Holt; Habeeb M. Ziauddin; David N. Wilson, both of Norwich, all of England

[73] Assignee: Bernard Matthews PLC, England

[21] Appl. No.: 284,437

[22] Filed: Dec. 14, 1988

[30] Foreign Application Priority Data

Dec. 24, 1987 [GB] United Kingdom ............... 8730125

[51] Int. Cl.⁴ ........................ A23P 1/10; A23P 1/12
[52] U.S. Cl. ...................................... 426/513; 17/49; 264/173; 264/211.11; 426/393; 426/410; 426/413; 426/516
[58] Field of Search ............... 426/410, 413, 513, 516, 426/393; 17/49; 264/211.11, 173

[56] References Cited

U.S. PATENT DOCUMENTS

| | | | |
|---|---|---|---|
| 2,247,312 | 6/1941 | Rumsey, Jr. | 426/413 |
| 2,373,865 | 4/1945 | Walter | 17/49 |
| 2,882,163 | 4/1959 | Knaff | 17/49 |
| 4,340,994 | 7/1982 | dos Santos . | |
| 4,363,822 | 12/1982 | Kleptz . | |
| 4,504,511 | 3/1985 | Binley | 426/516 |
| 4,544,560 | 10/1985 | O'Connell | 426/513 |
| 4,579,744 | 4/1986 | Thulin et al. | 426/283 |
| 4,610,844 | 9/1986 | Matthews et al. | 426/513 |
| 4,748,031 | 5/1988 | Koppa | 426/283 |
| 4,788,750 | 12/1988 | Bachtold . | |

FOREIGN PATENT DOCUMENTS

| | | |
|---|---|---|
| 0011402 | 5/1980 | European Pat. Off. . |
| 0024790 | 3/1981 | European Pat. Off. . |
| 0153024 | 8/1985 | European Pat. Off. . |
| 1154135 | 6/1969 | United Kingdom . |

*Primary Examiner*—Donald E. Czaja
*Assistant Examiner*—D. Workman
*Attorney, Agent, or Firm*—Oliff & Berridge

[57] ABSTRACT

Food products particularly of meat are extruded cased under pressure. The extrusion pressure, and the energy in the extrudate, makes the circular cross-section the only stable one on emergence from the extrusion head. In accordance with the present invention, two unstable shapes, D-shaped as described, are extruded each cased from its own extrusion head. The heads are disposed closely adjacent back to back so as to have a generally circular overall profile. An outer casing is fitted over the two heads. On extrusion the two D-shaped pieces abut one another and the outer casing to preserve their shapes until stabilized by freezing.

5 Claims, 5 Drawing Sheets

EXTRUSION OF MULTIPLE EXTRUDATES HAVING COMPLIMENTARY SHAPES

This invention relates to the extrusion of plastic (deformable) material and to the production of products of predetermined shapes by extrusion.

In accordance with the present invention there is provided a method of manufacturing shaped products from meat or other plastic material, such method comprising extruding from adjacent locations at least two extrudates into fitting inner casings and into an overall outer casing, the nature of the material and the conditions of extrusion being such that the two extrudates co-operate with one another to provide complementary predetermined shapes constrained within the outer casing.

The invention is based on the appreciation that a shape extruded under pressure into a casing will tend to adopt the circular cross section. By extruding from adjacent heads two or more cased shapes into an outer casing the composite of the shapes will tend to adopt the circular cross section within the outer casing but the individual shapes can be made to co-operate with one another so as to achieve stable non-circular profiles within the outer casing. Thus extrusion heads which together make up a substantial circle can be employed and we describe hereinafter a method wherein generally D-shaped heads, back-to-back, develop an overall cylindrical configuration within an outer casing.

However, the shaping can be achieved by interaction of the coextrudates under pressure rather than by the shape of the heads and combinations of head shaping and mutual interaction are envisaged.

The invention has particular though not exclusive application to the production of products from whole-muscle meat with the muscle scaffold network intact. The extrusion of such products as explained in our EPAs 0,024,790 and 0,153,024 presents particular problems. Not only does the pressure of extrusion influence the shape of the extrudate but the whole-muscle pieces compressed during the extrusion have inherent energy which makes the extrudate difficult to control.

The invention will now be described by way of example and with reference to the accompanying drawings wherein.

Figure 1:
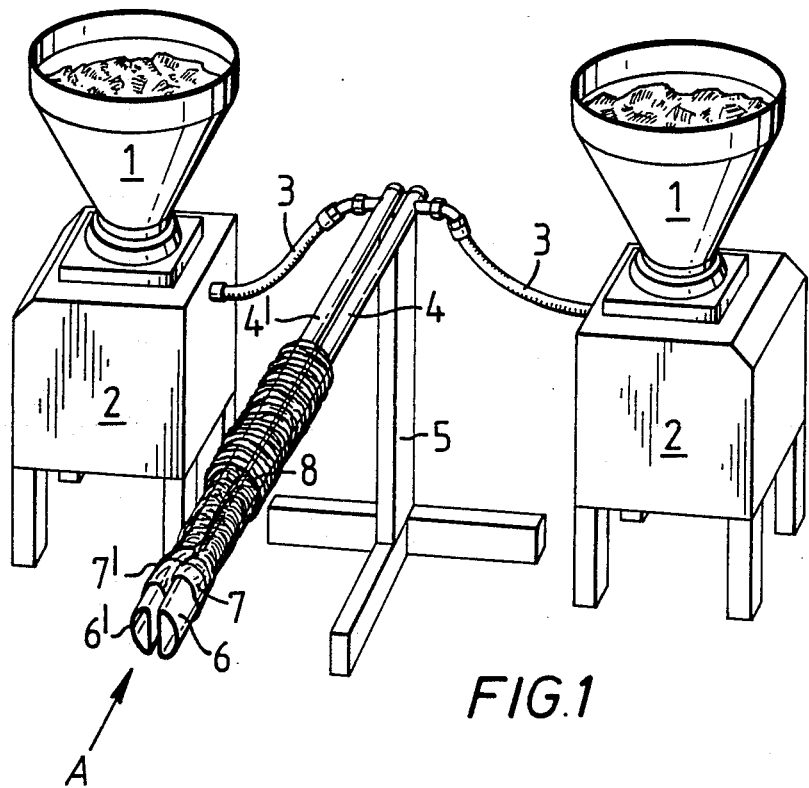
FIG. 1 is a perspective view, partly diagrammatic, of apparatus and materials prepared for carrying out the method in accordance with the present invention.
Figure 2:
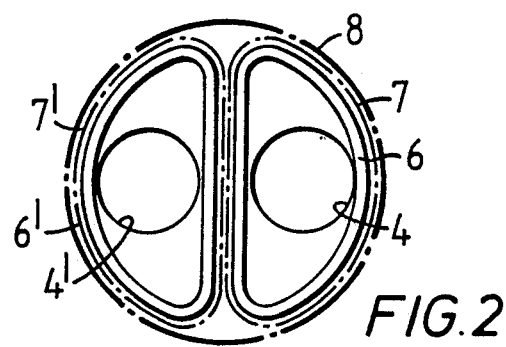
FIG. 2 is an enlarged view looking in the direction A of FIG. 1.

Referring initially to FIGS. 1 and 2 twin hoppers 1 are each loaded with whole-muscle meat M, usually lightly prepared by a massage with salt to release binding protein.

Each hopper 1 is associated with a housing 2 containing a vane pump for discharging the meat through pipes 3 into and through side by side extrusion mandrels 4 and 4'. The mandrels 4 are supported on structure diagrammatically represented at 5. Thus far the apparatus is similar to that described in EPA 0,024,790. In the method being described each mandrel 4 defines a single passage of circular cross section for whole-muscle meat but the invention contemplates processes wherein each mandrel and its associated head provides a coextrusion of meat with a surrounding layer, partial or complete, of for example fatty material. EPA 0,024,790 describes a coextrusion mandrel.

Returning to FIG. 1 of the drawings, each cylindrical mandrel 4 carries an extrusion head 6, 6' of generally D-shape. The heads 6, 6' are disposed back to back with the flat diametric faces closely adjacent so that the extrudates on emergence come into contact and co-operate in the manner to be described.

Threaded on to each mandrel and head is a fitting or casing sleeve 7, 7' of flexible non-toxic plastic material. Over the two adjacent heads 6 and the inner casings 7 is threaded an outer sleeve or casing 8 of any appropriate flexible plastic material capable of carrying out and surviving the extrusion process and subsequent freezing. Thus it can be seen that with the D-shaped heads adjacent and back to back the outside configuration taken up by the outer casing is generally circular.

Figure 3:
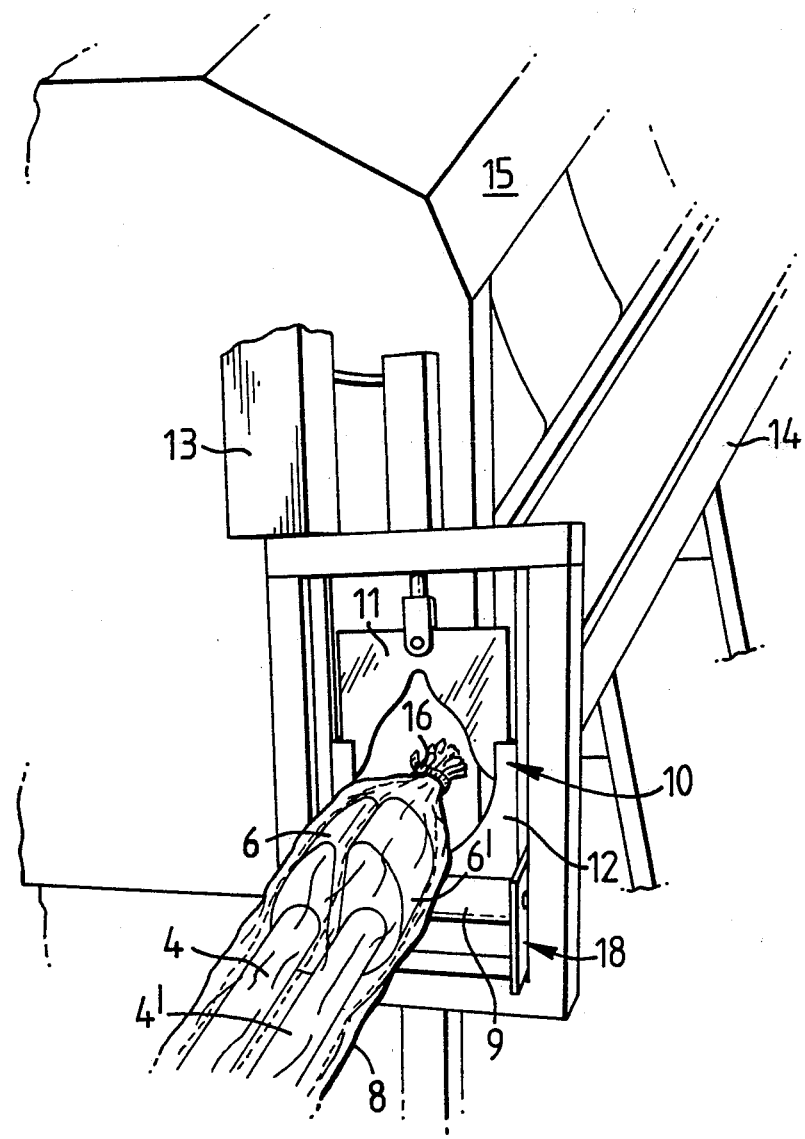
FIGS. 3 to 5 are perspective views illustrating stages in carrying out a method in accordance with the present invention.
Figure 4:
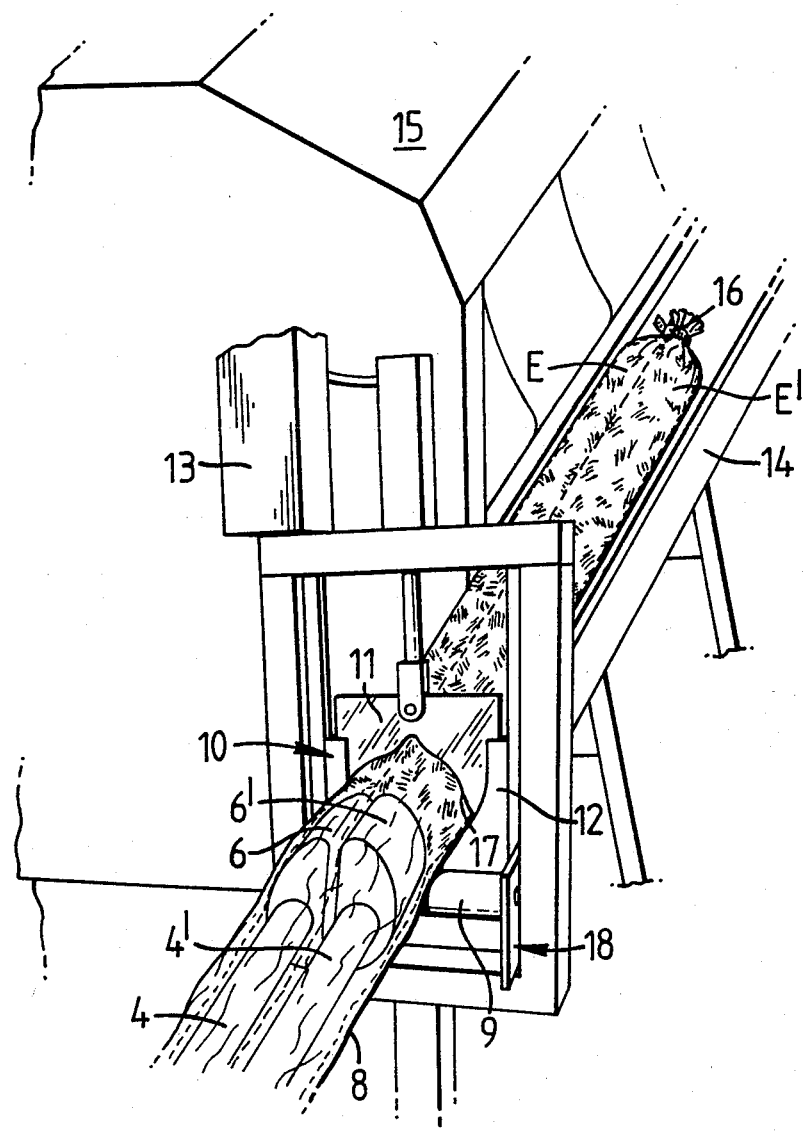
Figure 5:
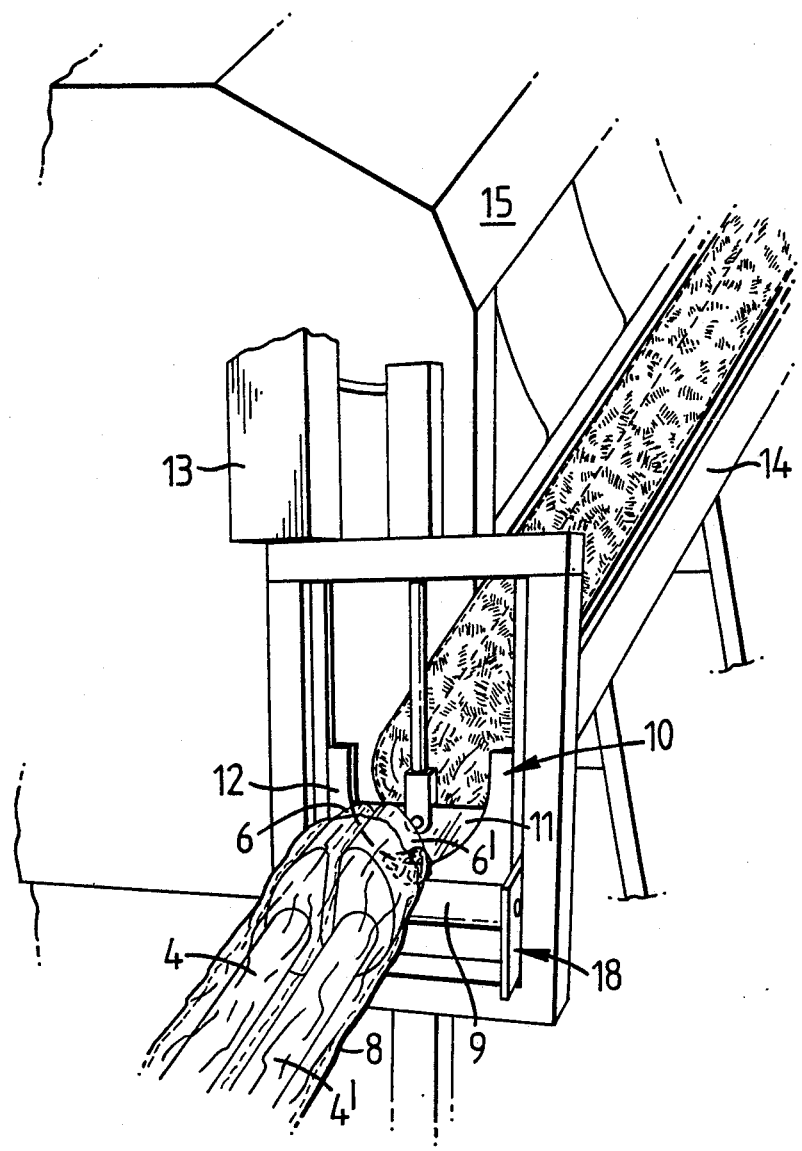

Referring now to FIGS. 3 to 5 of the drawings the extrusion process in accordance with the invention is illustrated in operation. The apparatus involved comprises a first short track 18 of laterally extending rollers 9 incorporating a closure, generally guillotine-like, device 10. This closure device comprises a vertically reciprocating recessed blunt blade 11 and a lower fixed recessed anvil 12 with appropriate operating means 13 to reciprocate the blade 11. The precise nature and operation of the closure devices is not fundamental to the invention as will be explained. Beyond the roller track 18 is an elongate belt conveyor 14 extending alongside a brine freezer 15. Means are provided for tipping the conveyor belt laterally to deposit articles carried thereby into the brine freezer 15 and these may be as described in EPA 0,024,790.

Figure 6:
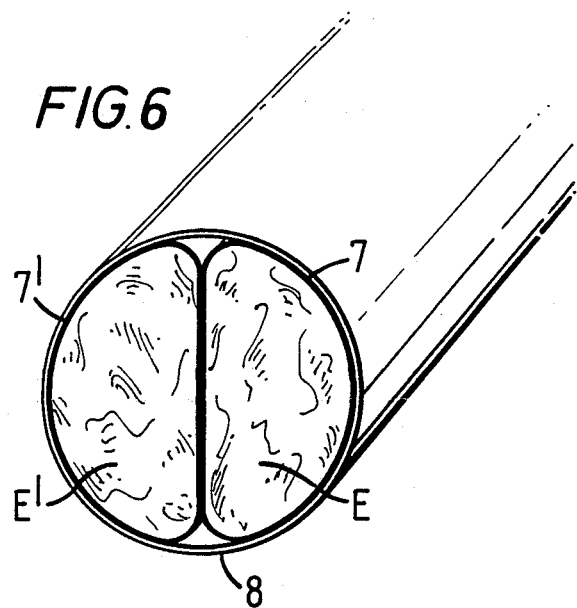
FIG. 6 is a section view through an assembly of extrudates produced in accordance with the invention.

Referring now specifically to FIG. 3 the ends of the inner casings 7, 7' and the outer casing 8 are pulled forwardly and secured closed by tie 16. Extrusion then commences (see FIG. 4) and the side-by-side cased extrudates E, E' within outer casing 8 advance forwardly over the track 18 through the gate 17 defined between shaped blade 11 and shaped anvil 12 and onto the advancing belt conveyor 14. The whole-muscle meat pumped under pressure into the individual casings 7 and constrained within the outer casing 8 strives to expand to the circular and, as can be seen in FIG. 6, a dynamic equilibrium assembly of two generally congruent and hemicylindrical cased extrudates E, E' in contact with one another is contained within the outer casing 8 during the process illustrated. It should be mentioned that if the delivery of the two extrusion pumps is not matched one extrudate will be larger than the other and the shapes developed could be different. In certain circumstances this may be desirable but for the present embodiment it is desired to produce substantially identical side by side D-shaped extrudates.

The extrusion continues until a desired length has been achieved as shown in FIG. 5 and the closure blade 11 lowered to seal the rear of the elongate extrudate assembly. This closure does not sever the casings but forms a multiple closure of casing ends 7, 7' and 8 about which a tie 16 can be secured to close and seal the front end of the multiple extrudate. The casings are then cut and a front tie effected as shown in FIG. 3 and the process repeated to produce another extrudate assembly in the form of an elongate log.

It should be understood that this semiautomatic closure procedure can be replaced by a single clipping procedure as described and illustrated in EPA 0,024,790. The closure apparatus herein described could be replaced by the closing, cutting and clipping mechanism capable in one stroke of closing the rear end of one coextrudate log and the front end of the log to be extruded immediately behind.

Figure 7:
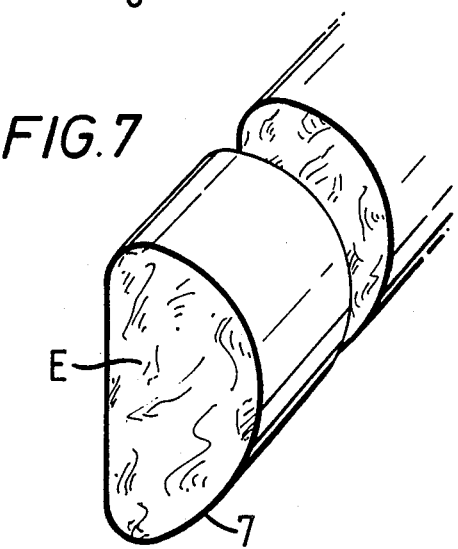
FIG. 7 is a view of the ultimate products of the present invention.

The log clipped at both ends is then deposited sidewardly into the brine freezer 15, the outer casing 8 protecting the products against the calcium chloride refrigerant in that freezer. The product is then solidified into the state shown in FIG. 6. After freezing solid in the freezer the outer casing 8 is stripped off and disposed of having served the dual function firstly of enabling the desired shaped extrudate to be produced and secondly of having protected the extrudate from the brine in the freezer. The product of the invention as shown in FIG. 7 comprise a body of whole-muscle meat and a casing 7, which casing may remain on the product during cooking.

The unfrozen extrudate or log is a food product in its own right and may be chilled, cooked, cured or otherwise treated.

The above described extrusion system producing two D-shaped profiles is but an example of one possible system in accordance with the invention. As a further example two generally circular extrusion heads side-by-side each dispensing a cased billet can have surrounding them an outer casing which takes up an elongate configuration with rounded ends. A stable system is developed on coextrusion though some flattening at the interfaces of the cylindrical extrudates takes place. Three generally circular heads disposed as a triad can again be encased to produce generally triangular extrudates. In principle the extrusions within the system can be shaped by the extrusion heads and/or by mutual interaction after extrusion within the outer casing. The latter shaping can be determined by the dimensions of the outer casing. Thus by calculation of relevant circumferences and experimental observations useful extruded shapes can be developed and extruded as a group.

We claim:

1. A method of manufacturing shaped products, such method comprising extruding from adjacent locations at least two extrudates into fitting flexible inner casings and into an overall outer flexible casing, the nature of the extrudates and the conditions of extrusion being such that the two extrudates co-operate with one another to provide complementary predetermined shapes constrained within the outer casing.

2. A method according to claim 1 wherein each extrudate is shaped by the extrusion head into the predetermined shape.

3. A method according to claim 2 wherein the extrusion takes place from two D-shaped extrusion heads disposed back to back and the outer casing takes up a generally circular cross section during the coextrusion.

4. A method according to claim 1 wherein the extrudates and the outer casing are extruded through a closing and sealing device and are thereafter frozen solid, the outer casing being removed and disposed of after the said freezing.

5. A method according to claim 1 wherein the extrudates comprise whole-muscle meat.

* * * * *